(12) United States Patent
Baek et al.

(10) Patent No.: US 12,256,405 B2
(45) Date of Patent: Mar. 18, 2025

(54) METHOD AND DEVICE FOR APPLYING LOGICAL CHANNEL LIMITATION IN WIRELESS COMMUNICATION SYSTEM

(71) Applicant: Samsung Electronics Co., Ltd., Suwon-si (KR)

(72) Inventors: Sangkyu Baek, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 17/755,785

(22) PCT Filed: Nov. 6, 2020

(86) PCT No.: PCT/KR2020/015519
§ 371 (c)(1),
(2) Date: May 6, 2022

(87) PCT Pub. No.: WO2021/091311
PCT Pub. Date: May 14, 2021

(65) Prior Publication Data
US 2022/0394752 A1  Dec. 8, 2022

(30) Foreign Application Priority Data

Nov. 6, 2019  (KR) .................. 10-2019-0141261
Feb. 13, 2020  (KR) .................. 10-2020-0017866

(51) Int. Cl.
*H04W 4/00* (2018.01)
*H04W 72/23* (2023.01)
*H04W 72/566* (2023.01)

(52) U.S. Cl.
CPC ......... *H04W 72/23* (2023.01); *H04W 72/569* (2023.01)

(58) Field of Classification Search
CPC .......................... H04W 72/23; H04W 72/569
See application file for complete search history.

(56) References Cited

U.S. PATENT DOCUMENTS

| | | |
|---|---|---|
| 2018/0359149 A1 | 12/2018 | Shaheen |
| 2019/0182896 A1 | 6/2019 | Shrestha et al. |
| 2019/0253197 A1* | 8/2019 | Babaei ................. H04L 1/188 |
| 2019/0289638 A1* | 9/2019 | Kung ................ H04W 74/0833 |

(Continued)

OTHER PUBLICATIONS

International Search Report and Written Opinion of the International Searching Authority dated Feb. 9, 2021, in connection with International Application No. PCT/KR2020/015519, 13 pages.

(Continued)

*Primary Examiner* — Abdelnabi O Musa

(57) ABSTRACT

The present disclosure relates to a method and apparatus for applying logical channel restriction in a wireless communication system. According to an embodiment of the present disclosure, an operation method of a terminal in a wireless communication system includes: receiving configuration information associated with restrictions for logical channels; and identifying, based on the configuration information, an uplink resource allocated with a configured scheduling-radio network temporary identifier (CS-RNTI), wherein when a value of a new data indicator (NDI) of the CS-RNTI is 0, the uplink resource is considered as a configured grant.

13 Claims, 12 Drawing Sheets

(56) References Cited

U.S. PATENT DOCUMENTS

| | | | | |
|---|---|---|---|---|
| 2020/0244403 A1* | 7/2020 | Talarico | ............... | H04L 5/0044 |
| 2020/0314814 A1* | 10/2020 | Baek | .................... | H04W 72/569 |
| 2021/0385796 A1* | 12/2021 | Shi | ....................... | H04W 72/02 |
| 2022/0070914 A1* | 3/2022 | Zhao | .................... | H04L 5/0053 |
| 2022/0123873 A1* | 4/2022 | Fu | ....................... | H04L 1/1854 |
| 2022/0353899 A1* | 11/2022 | Xiao | ..................... | H04L 1/188 |

OTHER PUBLICATIONS

3GPP TS 38.321 V15.7.0 (Sep. 2019), Technical Specification, 3rd Generation Partnership Project; Technical Specification Group Radio Access Network; NR; Medium Access Control (MAC) protocol specification (Release 15), Sep. 2019, 78 pages.

Ericsson, "Enhancement of Configured Grant for NR URLLC," R1-1910550, 3GPP TSG RAN WG1 Meeting #98bis, Chongqing, China, Oct. 14-20, 2019, 10 pages.

Nokia, et al., "LCP restrictions enhancements, " R2-1913458, 3GPP TSG-RAN WG2 Meeting #107bis, Chongqing, China, Oct. 14-18, 2019, 3 pages.

* cited by examiner

METHOD AND DEVICE FOR APPLYING LOGICAL CHANNEL LIMITATION IN WIRELESS COMMUNICATION SYSTEM

CROSS-REFERENCE TO RELATED APPLICATIONS

This application is a 371 National Stage of International Application No. PCT/KR2020/015519, filed Nov. 6, 2020, which claims priority to Korean Patent Application No. 10-2019-0141261, filed on Nov. 6, 2019, and Korean Patent Application No. 10-2020-0017866, filed on Feb. 13, 2020, the disclosures of which are herein incorporated by reference in their entirety.

BACKGROUND

1. Field

The present disclosure relates to a method and apparatus for applying logical channel restriction in a wireless communication system, and more particularly, to a method and apparatus for applying a logical channel priority for resource usage to a logical channel that satisfies particular requirements.

2. Description of Related Art

Efforts have been made to develop an improved 5th generation (5G) communication system or pre-5G communication system to keep up with growing wireless data traffic demand after the commercialization of 4th generation (4G) communication systems. For this reason, the 5G or pre-5G communication system is called a beyond 4G network communication system or a post long-term evolution (LTE) system. Implementation of 5G communication systems in an ultra-high frequency (millimeter-wave (mmWave)) band (such as a 60 (80)-GHz band) is under consideration to achieve high data transfer rates. To mitigate path loss of radio waves and increase transmission distance of radio waves in an ultra-high frequency band for 5G communication systems, various technologies such as beamforming, massive multiple-input multiple-output (massive MIMO), full dimensional MIMO (FD-MIMO), array antennas, analog beamforming, and large-scale antennas are being studied and applied to NR systems. Furthermore, to improve system networks for 5G communication systems, various technologies including evolved small cells, advanced small cells, cloud radio access network (Cloud-RAN), ultra-dense networks, device to device (D2D) communication, wireless backhaul, moving networks, cooperative communication, coordinated multi-points (CoMP), and interference cancellation are currently being developed. In addition, for 5G systems, advanced coding modulation (ACM) schemes such as Hybrid FSK and QAM Modulation (FQAM) and Sliding Window Superposition Coding (SWSC) and advanced access techniques such as Filter Bank Multicarrier (FBMC), non-orthogonal multiple access (NOMA), sparse code multiple access (SCMA), etc. are being developed.

Moreover, the Internet has evolved from a human-centered connection network, in which humans create and consume information, to the Internet of things (IoT) network in which dispersed components such as objects exchange information with one another to process the information. Internet of Everything (IoE) technology has emerged, in which the IoT technology is combined with, for example, technology for processing big data through connection with a cloud server. To implement the IoT, technologies such as a sensing technology, a wired/wireless communication and network infrastructure, a service interface technology, and a security technology are required, and thus, research has recently been conducted into technologies such as sensor networks for interconnecting objects, machine to machine (M2M) communication, and machine type communication (MTC). In an IoT environment, intelligent Internet technology services may be provided to create new values for human life by collecting and analyzing data obtained from interconnected objects. The IoT may be applied to various fields such as smart homes, smart buildings, smart cities, smart cars or connected cars, a smart grid, health care, smart home appliances, advanced medical services, etc., through convergence and integration between existing information technology (IT) and various industries.

Thus, various attempts are being made to apply a 5G communication system to the IoT network. For example, technologies such as sensor networks, M2M communication, MTC, etc., are implemented using 5G communication techniques such as beamforming, MIMO, array antennas, etc. The application of a cloud RAN as the above-described big data processing technology may be an example of convergence between the 5G and IoT technologies.

SUMMARY

The present disclosure provides a logical channel management method and apparatus capable of satisfying preset requirements for grant transmission in a wireless communication system.

DETAILED DESCRIPTION

Figure 1:
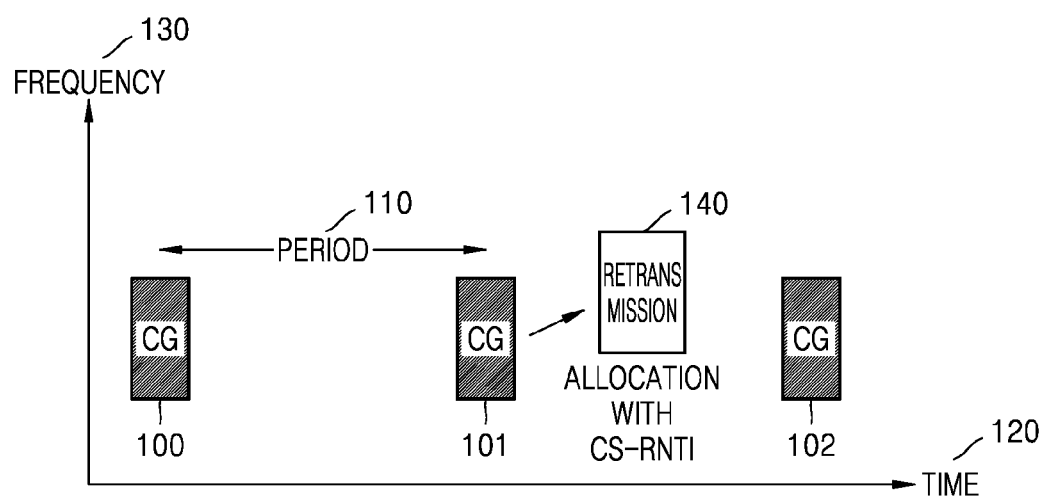
FIG. 1 is a diagram for explaining configuration of a configured grant retransmission according to an embodiment.

According to an embodiment of the present disclosure, an operation method of a terminal in a wireless communication system includes: receiving configuration information associated with restrictions for logical channels; and identifying, based on the configuration information, an uplink resource allocated with a configured scheduling-radio network temporary identifier (CS-RNTI), wherein when a value of a new data indicator (NDI) of the CS-RNTI is 0, the uplink resource is considered as a configured grant.

The configured grant may be configured by an allowed configured grant list.

The allowed configured grant list may include index information, identifier information, or subcarrier spacing information of the configured grant.

The operation method may further include identifying, based on the configuration information, a dynamic uplink resource allocated with a cell RNTI (C-RNTI), wherein an allowed physical layer priority configuration is applied to the dynamic uplink resource.

The operation method may further include selecting a logical channel to which the allowed physical layer priority configuration is applied, and an allowed physical layer priority configuration may be applied to the dynamic uplink resource.

The operation method may further include applying, based on the configuration information, restrictions to the uplink resource for the logical channels.

The restrictions may include applying a priority rule associated with the configured grant.

According to another embodiment of the present disclosure, a terminal in a wireless communication system includes:

a transceiver; and at least one processor connected with the transceiver, wherein the at least one processor is configured to: receive configuration information associated with restrictions for logical channels; and determine, based on the configuration information, an uplink resource allocated with a CS-RNTI, wherein when a value of an NDI of the CS-RNTI is 0, the uplink resource is considered as a configured grant.

The configured grant may be configured by an allowed configured grant list.

The allowed configured grant list may include index information, identifier information, or subcarrier spacing information of the configured grant.

The at least one processor may be further configured to determine, based on the configuration information, a dynamic uplink resource allocated with a C-RNTI, and an allowed physical layer priority configuration may be applied to the dynamic uplink resource.

The at least one processor may be further configured to apply, based on the configuration information, restrictions to the uplink resource for the logical channels.

The restrictions may include applying a priority rule associated with the configured grant.

According to another embodiment of the present disclosure, an operation method of a base station in a wireless communication system includes: transmitting configuration information associated with restrictions for logical channels; and receiving, based on the configuration information, uplink data on an uplink resource allocated with a CS-RNTI, wherein when a value of an NDI of the CS-RNTI is 0, the uplink resource is considered as a configured grant.

According to another embodiment of the present disclosure, a base station in a wireless communication system includes: a transceiver; and at least one processor connected with the transceiver, wherein the at least one processor is configured to: transmit configuration information associated with restrictions for logical channels; and receive, based on the configuration information, uplink data on an uplink resource allocated with a CS-RNTI wherein when a value of an NDI of the CS-RNTI is 0, the uplink resource is considered as a configured grant.

In the following description of the present disclosure, when it is determined that a detailed description of a related known function or configuration may unnecessarily obscure the essence of the present disclosure, the detailed description thereof will be omitted. Hereinafter, embodiments of the present disclosure will be described in detail with reference to the accompanying drawings.

As used in the following description, terms identifying access nodes, terms indicating network entities, terms indicating messages, terms indicating interfaces between network entities, terms indicating various types of identification information, etc. are exemplified for convenience of description. Accordingly, the present disclosure is not limited to terms to be described later, and other terms representing objects having the equivalent technical meaning may be used.

Hereinafter, for convenience of descriptions, the disclosure uses terms and names defined in the 3rd Generation Partnership Project Long Term Evolution (3GPP LTE) specifications. However, the disclosure is not limited by the terms and names but may also be equally applied to systems that comply with other standards.

As a representative example of a broadband wireless communication system, an LTE system adopts an orthogonal frequency division multiplexing (OFDM) scheme for downlink (DL) and a single carrier frequency division multiple access (SC-FDMA) scheme for uplink (UL). UL refers to a radio link through which a terminal (user equipment (UE)) or mobile station (MS)) transmits data or a control signal to a base station (BS) (or next generation Node B (gNode B)), and DL refers to a radio link through which the BS transmits data or a control signal to the terminal. In the multiple access schemes as described above, data or control information of each user may be distinguished by allocating and operating time-frequency resources carrying the data or the control information for each user to prevent overlapping i.e., maintain orthogonality therebetween.

Because a post-LTE communication system, i.e., a 5th generation (5G) communication system, needs to be able to freely reflect various requirements from users and service providers, the 5G communication system is required to support services that simultaneously satisfy the various requirements. Services being considered for 5G communication systems include Enhanced Mobile BroadBand (eMBB), Massive Machine Type Communication (mMTC), Ultra-Reliable Low-Latency Communication (URLLC), etc.

According to some embodiments, eMBB may aim to provide higher data transfer rates than those supported by the existing LTE, LTE-advanced (LTE-A), or LTE-Pro. For example, in 5G communication systems, eMBB should be able to deliver peak data rates of 20 gigabits per second (Gbps) in DL and 10 Gbps in UL from a BS perspective. Furthermore, the 5G communication systems should be able to provide better user perceived data rates while simultaneously delivering the peak data rates. To meet such requirements, the 5G communication systems may require improvement of various transmission/reception technologies including a further improved multi-input multi-output (MIMO) transmission technology. Furthermore, while a current LTE system transmits signals by using a maximum transmission bandwidth of 20 megahertz (MHz) in the 2 GHz band, a 5G communication system may satisfy data transfer rates required by a 5G technology by using a wider frequency bandwidth than 20 MHz in the 3 GHz to 6 GHz bands or the bands above 6 GHz.

At the same time, mMTC is being considered to support application services such as the Internet of Thing (IoT) in 5G communication systems. In order to efficiently provide the IoT, the mMTC may require support of massive connection with terminals in a cell, enhanced terminal coverage, improved battery life, low terminal cost, etc. Because IoT is a system equipped with multiple sensors and various devices to provide communication functions, it must be able to support a large number of terminals (e.g., one million terminals per square kilometer (km2)) in the cell. Furthermore, because a terminal supporting the mMTC is highly likely to be located in a shaded area that cannot be covered by a cell, such as a basement of a building, due to characteristics of the service, the mMTC may require wide area coverage compared to other services provided by a 5G communication system. The terminal supporting the mMTC should be configured as a low-cost terminal and require a very long battery life time such as 10 to 15 years because it is difficult to frequently replace a battery of the terminal.

Lastly, URLLC is a cellular-based wireless communication service used for mission-critical applications such as remote control of robots or machinery, industrial automation, unmanned aerial vehicles (UAVs), remote health care, emergency alert services, etc. Thus, URLLC communications should be able to provide very low latency (ultra-low latency) and extremely high reliability (ultra-high reliability). For example, services supporting URLLC may have to satisfy air interface latency of less than 0.5 milliseconds (ms) and simultaneously have requirements of packet error rate of equal to or less than 10-5. Thus, for the services supporting URLLC a 5G system has to provide a transmission time interval (TTI) shorter than for other services and may simultaneously require a design for allocating wide frequency-band resources to ensure high reliability of a communication link.

The above-described three services considered in the 5G communication systems, i.e., eMBB, URLLC, and mMTC may be multiplexed in one system for transmission. Different transmission/reception techniques and transmission/reception parameters may be used between services to satisfy different requirements for the respective services. However, the mMTC, URLLC, and eMBB are merely examples of different service types, and service types to which the present disclosure is applied are not limited to the above-described examples.

Although embodiments of the present disclosure are hereinafter described as an example of an LTE or LTE-A, LTE Pro, or 5G (new radio (NR) that is next-generation mobile communication) system, the embodiments of the present disclosure may be applied to other communication systems having similar technical backgrounds and channel configurations. Furthermore, it should be understood by those skilled in the art that embodiments of the present disclosure are applicable to other communication systems through modifications not departing from the scope of the present disclosure.

FIG. 1 is a diagram for explaining configuration of a configured grant (CG) retransmission, according to an embodiment.

When a terminal performs UL transmission, there are two methods of allocating UL radio resources on which data is transmitted: a dynamic grant (DG) and a CG. According to the DG, radio resources may be allocated to the terminal by using a DL control information (DCI) format in a physical downlink control channel (PDCCH). In this case, a PDCCH resource may be scrambled with a radio network temporary identifier (RNTI) for transmission, and RNTIs may be classified into a cell RNTI (C-RNTI), a configured scheduling-RNTI (CS-RNTI), etc., depending on purposes thereof. Resources allocated using the C-RNTI may be used for initial transmission and retransmission on a normal DG. A resource allocated using the CS-RNTI may be a retransmission resource of a CG or may be used to indicate activation or deactivation of a CG type 2. A CG type 2 will be described at a later time.

CGs refers to resources (100, 101, and 102) that are repeated over a specific period 110 on a time axis 120. When CGs are configured and activated, configured radio resources may be repeated until deactivation or release is applied thereto. There may be two types of CGs: a CG type 1 and a CG type 2. The CG type 1 refers to a CG where not only a periodicity of the CG but also all resource configurations are provided via a radio resource control (RRC) configuration message. The CG type 1 does not need a separate activation and deactivation procedure, and may be activated when configured for an active bandwidth part (BWP) and deactivated when configuration is released. For the CG type 2, only some information such as a periodicity and a CG index may be pre-configured via an RRC configuration message, while activation and deactivation may be indicated by DCI assigned with a CS-RNTI.

When a CG is configured, a BS may allocate a retransmission resource to a terminal when the terminal performs transmission on a CG resource but the BS fails to perform reception or when the terminal does not perform transmission on a CG resource but the BS desires retransmission on the CG resource. FIG. 1 shows an embodiment in which a retransmission resource for a CG resource in operation 101 is allocated with a CS-RNTI and configured (operation 140). In this case, because the CG resource in operation 101 and the retransmission resource in operation 140 are configured using the same hybrid automatic repeat and request (HARQ) process ID, the terminal may determine that the retransmission resource is a retransmission resource for the corresponding CG. Here, the resource allocated with the CS-RNTI may be classified as a DG because such resource allocation is a one-time event for retransmission on a specific CG. However, because the resource classified as a DG is a resource on which data to be transmitted on a CG can be transmitted, data included therein may be data having the same quality of service (QoS) requirements as data included in the CG.

Figure 2:
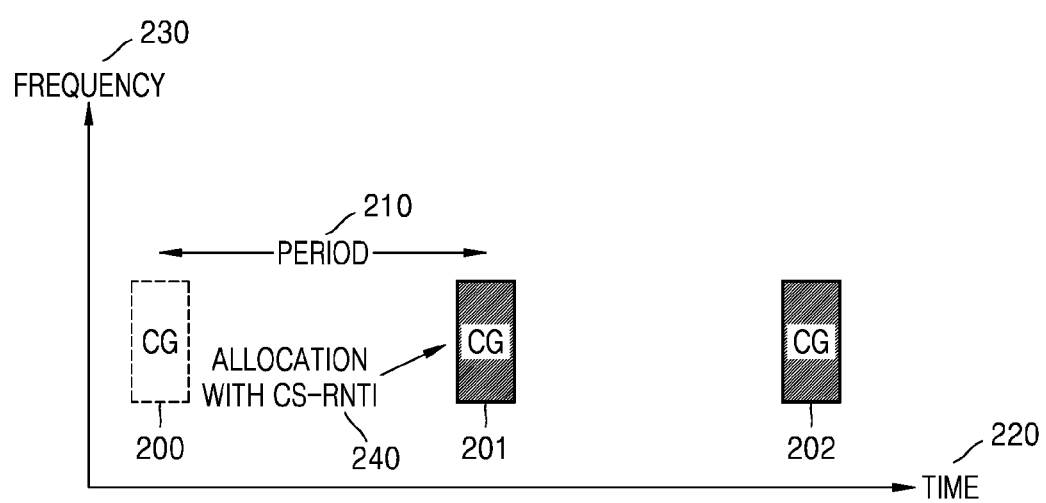
FIG. 2 is a diagram for explaining activation of a configured grant type 2 according to an embodiment.

FIG. 2 is a diagram for explaining activation of a CG type 2 according to an embodiment. When the terminal performs UL transmission, there are two methods of allocating UL radio resources on which data is transmitted: a DG and a CG. In the DG, radio resources may be allocated to the terminal via a DCI format in a PDCCH. In this case, a PDCCH resource may be scrambled with an RNTI for transmission, and RNTIs may be classified into a C-RNTI, a CS-RNTI, etc., depending on purposes thereof. Resources allocated using the C-RNTI may be used for initial transmission and retransmission on a normal DG. A resource allocated using the CS-RNTI may be a retransmission resource for a CG or may be used to indicate activation or deactivation of a CG type 2.

CGs refers to resources (200, 201, or 202) that are repeated over a specific period 210 on a time axis 220. When CGs are configured and activated, configured radio resources may be repeated until deactivation or release is applied thereto. There may be two types of CGs: a CG type 1 and a CG type 2. The CG type 1 refers to a CG where not only a periodicity of the CG but also all resource configurations are provided via an RRC configuration message. The CG type 1 does not need a separate activation and deactivation procedure, and may be activated when configured for an active BWP and deactivated when configuration is released. For the CG type 2, only some information such as a periodicity and a CG index may be pre-configured via an RRC configuration message, while activation and deactivation may be indicated by DCI assigned with a CS-RNTI.

When the CG type 2 is configured, the BS may indicate activation of the CG in a DCI format addressed to a CS-RNTI. FIG. 2 shows an embodiment in which a CG resource in operation 200 is deactivated and not used, but afterward the BS indicates activation of a corresponding CG with the CS-RNTI (240) so that the terminal actually uses resources starting with a CG resource in operation 201 to transmit data. Thereafter, the terminal may transmit data on corresponding CG resources (201 and 202) until it receives indication of deactivation or release thereof. Here, the resource allocated with the CS-RNTI may be classified as a DG because such resource allocation is a one-time event for activation of a particular CG. However, because the resource classified as a DG is a resource on which data to be transmitted on a CG can be transmitted, data included therein may be data having the same QoS requirements as data included in the CG.

Figure 3:
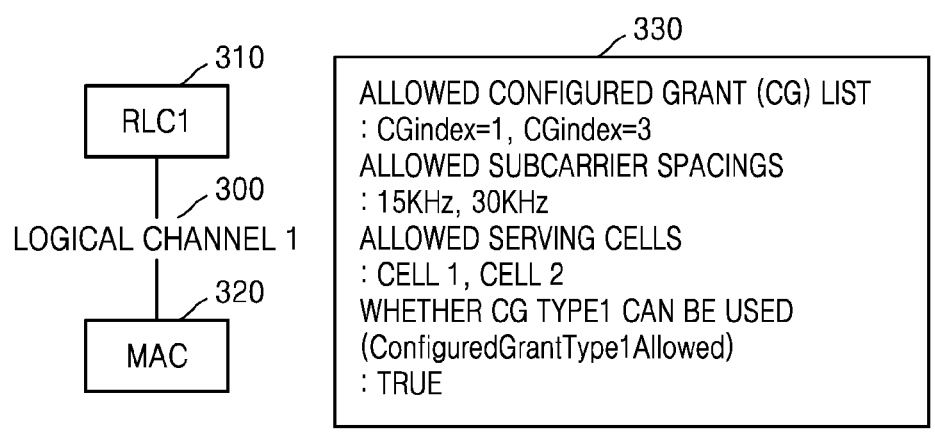
FIG. 3 is a diagram for explaining a method of applying logical channel restriction according to an embodiment.

FIG. 3 is a diagram for explaining a method of applying logical channel restriction according to an embodiment.

In a 5G communication system, a logical channel 1 300 refers to a path connecting a radio link control (RLC) 1 entity 310 and a medium access control (MAC) entity 320, and one logical channel may correspond to one RLC entity. In UL data transmission, each logical channel may have restrictions on available radio resources (330). Restrictions on radio resources for each logical channel are for allowing data of a logical channel to be transmitted only on specific resources by taking into account QoS requirements, etc. of data processed in the logical channel. For cell restrictions associated with a logical channel, one or more of an allowed CG list, allowed subcarrier spacings, allowed serving cells, and whether a CG type 1 can be used (ConfiguredGrant-Type1 Allowed) may be configured. In the embodiment of FIG. 3, logical channel 1 300 may be configured to be allowed to use CGs with CG indexes of 1 and 3, subcarrier spacings of an available resource being 15 KHz and 30 KHz, serving cells 1 and 2, and the CG type 1. In this case, the terminal may use a corresponding resource when all of the configured cell restrictions are satisfied. Moreover, because FIG. 3 illustrates an example in which a logical channel restriction is applied, different logical channel configurations may be applied for each logical channel, and logical channel configurations may not be applied for some logical channels. When a new MAC protocol data unit (PDU) is generated, the logical channel restriction may be applied to allow only a logical channel that is allowed to use a resource to participate in logical channel prioritization so that data is included in the MAC PDU.

Figure 4:
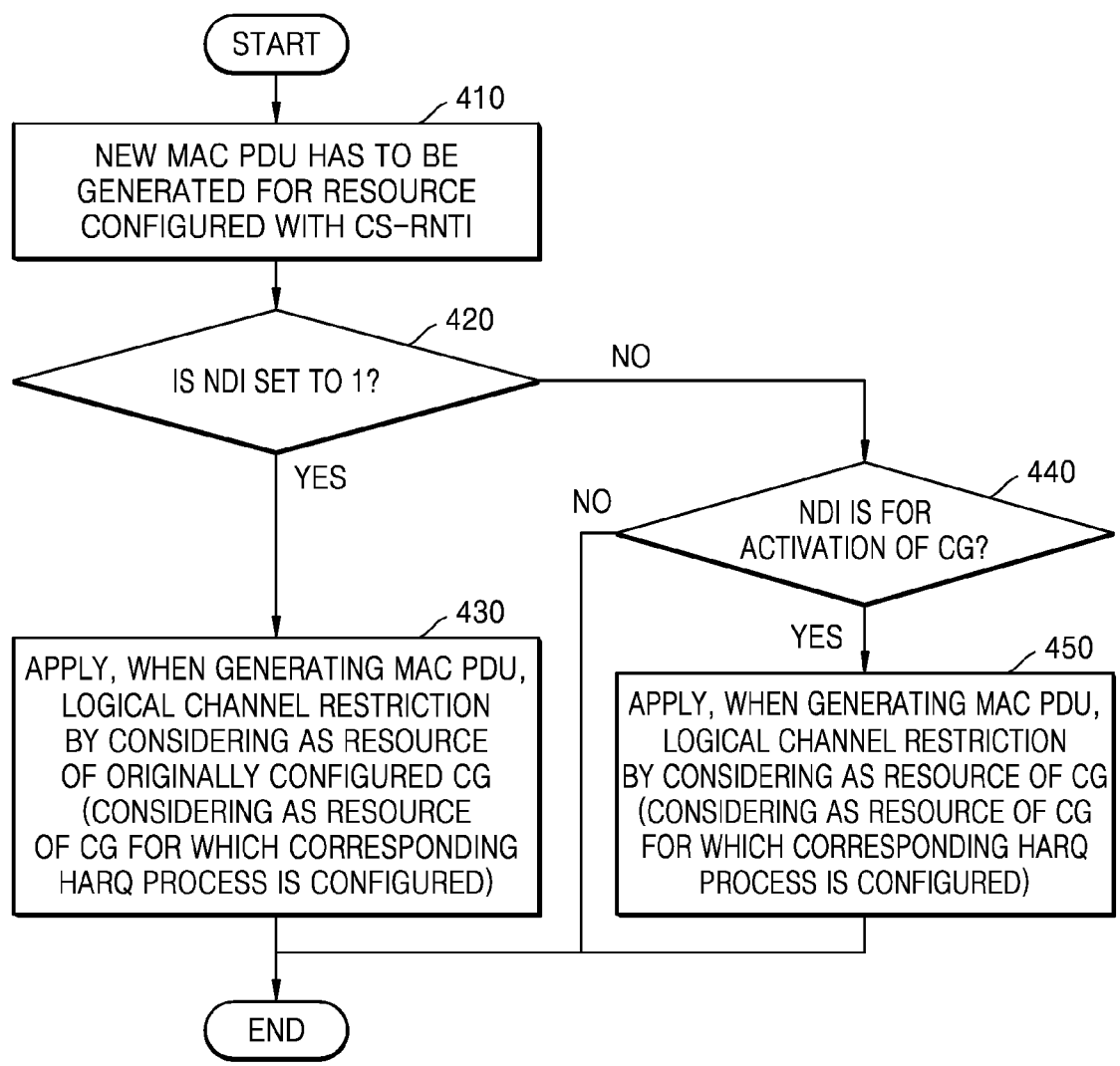
FIG. 4 is a flowchart of a method of applying logical channel restriction for a resource configured with a configured scheduling radio network temporary identifier (CS-RNTI), according to an embodiment.

FIG. 4 is a flowchart of a method of applying logical channel restriction for a resource configured with a CS-RNTI, according to an embodiment.

A situation may occur in which a terminal needs to generate a MAC PDU for a resource configured with a CS-RNTI (operation 410). The situation in which the terminal has to generate a MAC PDU for the resource configured with the CS-RNTI may be at least one of a situation in which a CG is activated so that the terminal has to use a CG resource or a situation in which retransmission using a CG occurs. In this regard, which of the above-described situations occurs may be identified based on a value of a new data indicator (NDI) (operation 420). When the value of the NDI is set to 1, this may indicate retransmission on the CG. When the terminal is allocated a retransmission resource, in case there is no MAC PDU in an HARQ buffer, a new MAC PDU needs to be generated. When generating this MAC PDU, by considering the resource allocated with the CS-RNTI as a resource of an originally configured CG, the same logical channel restriction as for the resource of the originally configured CG may be applied (operation 430). For example, when a retransmission resource allocated with a CS-RNTI is a retransmission resource for a CG configured with a CG index of 1, a logical channel prioritization operation may be performed so that logical channels, each including a CG with a CG index of 1 in an allowed CG list, are allowed to use the CG by considering the retransmission resource as a resource of the CG. However, this is merely an embodiment, and according to another embodiment, when generating a MAC PDU, the resource allocated with the CS-RNTI may be considered as a resource of a CG for which a corresponding HARQ process is configured. For example, when a certain CG uses an HARQ process having an HARQ process ID=2, a radio resource allocated with a CS-RNTI for HARQ process 2 may be considered as a CG for the HARQ process 2. In some embodiments, the same priority rule as that for a CG may be applied to an operation of determining a priority when two resources configured with the CS-RNTI as CG resources overlap with each other. When the value of the NDI is not 1, this means that the NDI has a value of 0, and the NDI having a value of 0 may indicate activation or deactivation of a CG. When the NDI indicates the activation of the CG (operation 440), when generating the MAC PDU, logical channel restriction may be applied by considering a radio resource indicated by an activated resource as a CG resource. However, this is merely an example, and in another embodiment, when the MAC PDU is generated, a radio resource indicated by the activated resource may be considered as a resource of a CG in which a corresponding HARQ process is configured (operation 450).

In the embodiment of FIG. 4, an allowed CG list may be applied for a resource on which the CG is retransmitted. The terminal may be allocated a UL radio resource having an NDI value of 1 for the UL resource allocated with the CS-RNTI. In this case, this may mean that logical channels including a CG ID corresponding to the allocated UL radio resource in the allowed CG list use the corresponding UL radio resource. Using the UL radio resource may mean that the logical channels participate in a logical channel prioritization process.

In addition, in the embodiment of FIG. 4, the allowed CG list may be applied for an activated resource of a CG. The terminal may be allocated a UL radio resource having an NDI value of 0 for the UL resource allocated with the CS-RNTI. In this case, this may mean that logical channels including a CG ID corresponding to the allocated UL radio resource in the allowed CG list use the corresponding UL radio resource. Using the UL radio resource may mean that the logical channels participate in the logical channel prioritization process.

Therefore, the allowed CG list that can be configured via each logical channel configuration may be configured to include an ID of a CG associated with a UL CG or the UL radio resource allocated with the CS-RNTI.

In some embodiments, the same priority rule as that for a CG may be applied to an operation of determining a priority when two resources configured with the CS-RNTI as CG resources overlap with each other.

Figure 5:
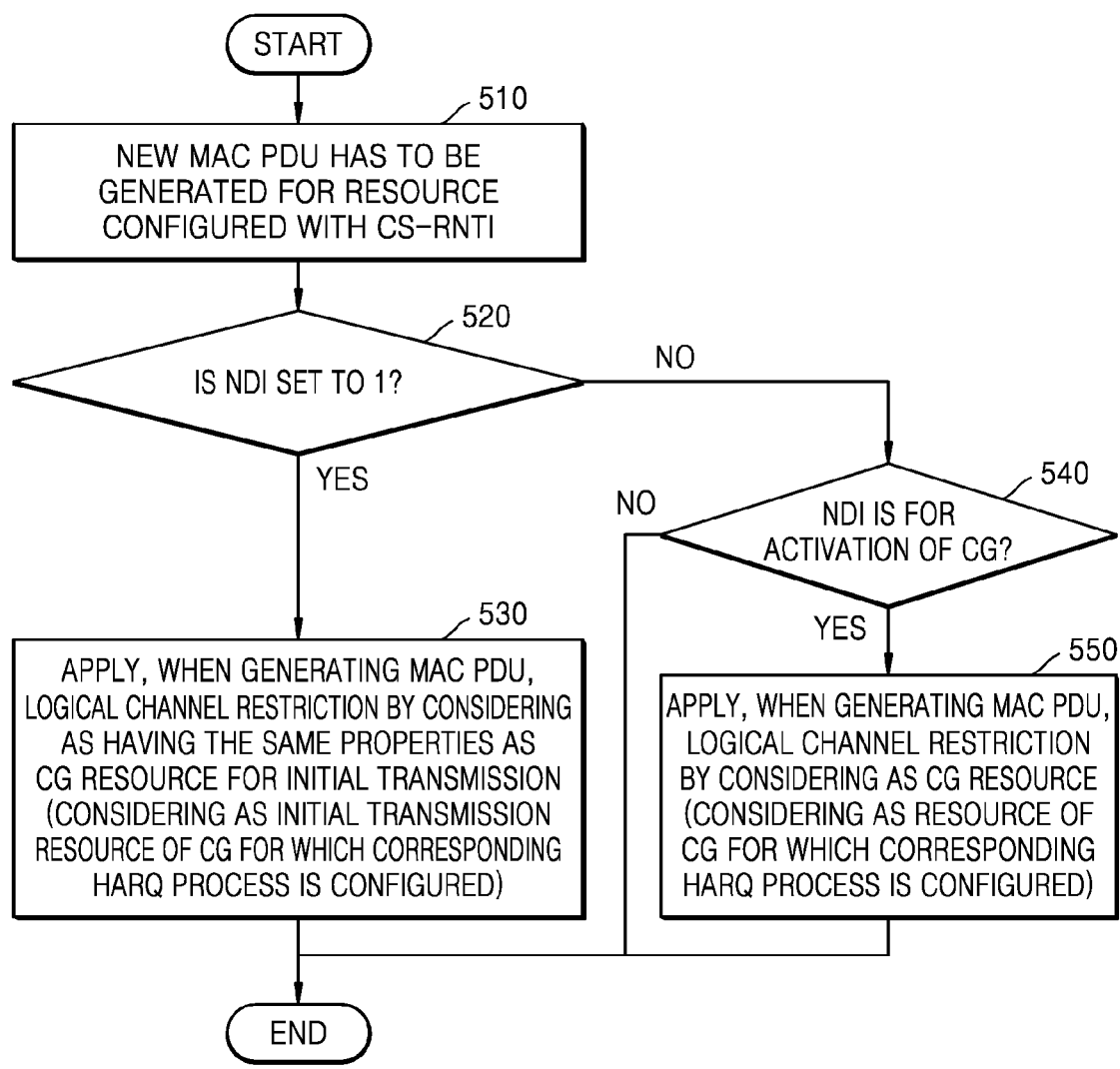
FIG. 5 is a flowchart of a method of applying logical channel restriction for a resource configured with a CS-RNTI, according to another embodiment.

FIG. 5 is a flowchart of a method of applying logical channel restriction for a resource configured with a CS-RNTI, according to another embodiment. A situation may occur in which a terminal needs to generate a MAC PDU for a resource configured with a CS-RNTI (operation 510). The situation in which the terminal has to generate a MAC PDU for the resource configured with the CS-RNTI may be at least one of a situation in which a CG is activated so that the terminal has to use a CG resource or a situation in which retransmission using a CG occurs. In this regard, which of the above-described situations occurs may be identified based on a value of an NDI (operation 520). When the value of the NDI is set to 1, this may indicate retransmission on the CG. When the terminal is allocated a retransmission resource, in case there is no MAC PDU in an HARQ buffer, a new MAC PDU needs to be generated. When generating this MAC PDU, logical channel restriction may be applied by considering the resource allocated with the CS-RNTI to have the same properties as a CG resource for initial transmission (operation 530). For example, when a retransmission resource allocated with a CS-RNTI is a retransmission resource for a CG configured with a CG index of 1, a logical channel prioritization operation may be performed so that logical channels, each including a CG with a CG index of 1 in an allowed CG list, are allowed to use the CG by considering the retransmission resource as an initial transmission resource of the CG. However, this is merely an embodiment, and according to another embodiment, when generating a MAC PDU, the resource allocated with the CS-RNTI may be considered as an initial transmission resource of a CG for which a corresponding HARQ process is configured. For example, when a certain CG uses an HARQ process having an HARQ process ID=2, a radio resource allocated with a CS-RNTI for HARQ process 2 may be considered as initial transmission of the CG. In some embodiments, the same priority rule as that for a CG may be applied to an operation of determining a priority when two resources configured with the CS-RNTI as CG resources overlap with each other. When the value of the NDI is not 1, this means that the NDI has a value of 0, and the NDI having a value of 0 may indicate activation or deactivation of a CG. When the NDI indicates the activation of the CG (operation 540), when generating the MAC PDU, logical channel restriction may be applied by considering a radio resource indicated by an activated resource as a CG resource. However, this is merely an example, and in another embodiment, when the MAC PDU is generated, a radio resource corresponding to the activated resource may be considered as a resource of a CG in which a corresponding HARQ process is configured (operation 550).

In the embodiment of FIG. 5, an allowed CG list may be applied for a resource on which the CG is retransmitted. The terminal may be allocated a UL radio resource having an NDI value of 1 for the UL resource allocated with the CS-RNTI. In this case, this may mean that logical channels including a CG ID corresponding to the allocated UL radio resource in the allowed CG list use the corresponding UL radio resource. Using the UL radio resource may mean that the logical channels participate in a logical channel prioritization process.

In addition, in the embodiment of FIG. 4, the allowed CG list may be applied for an activated resource of a CG. The terminal may be allocated a UL radio resource having an NDI value of 0 for the UL resource allocated with the CS-RNTI. In this case, this may mean that logical channels including a CG ID corresponding to the allocated UL radio resource in the allowed CG list use the corresponding UL radio resource. Using the UL radio resource may mean that the logical channels participate in the logical channel prioritization process.

Therefore, the allowed CG list that can be configured via each logical channel configuration may be configured to include an ID of a CG associated with a UL CG or the UL radio resource allocated with the CS-RNTI.

Figure 6:
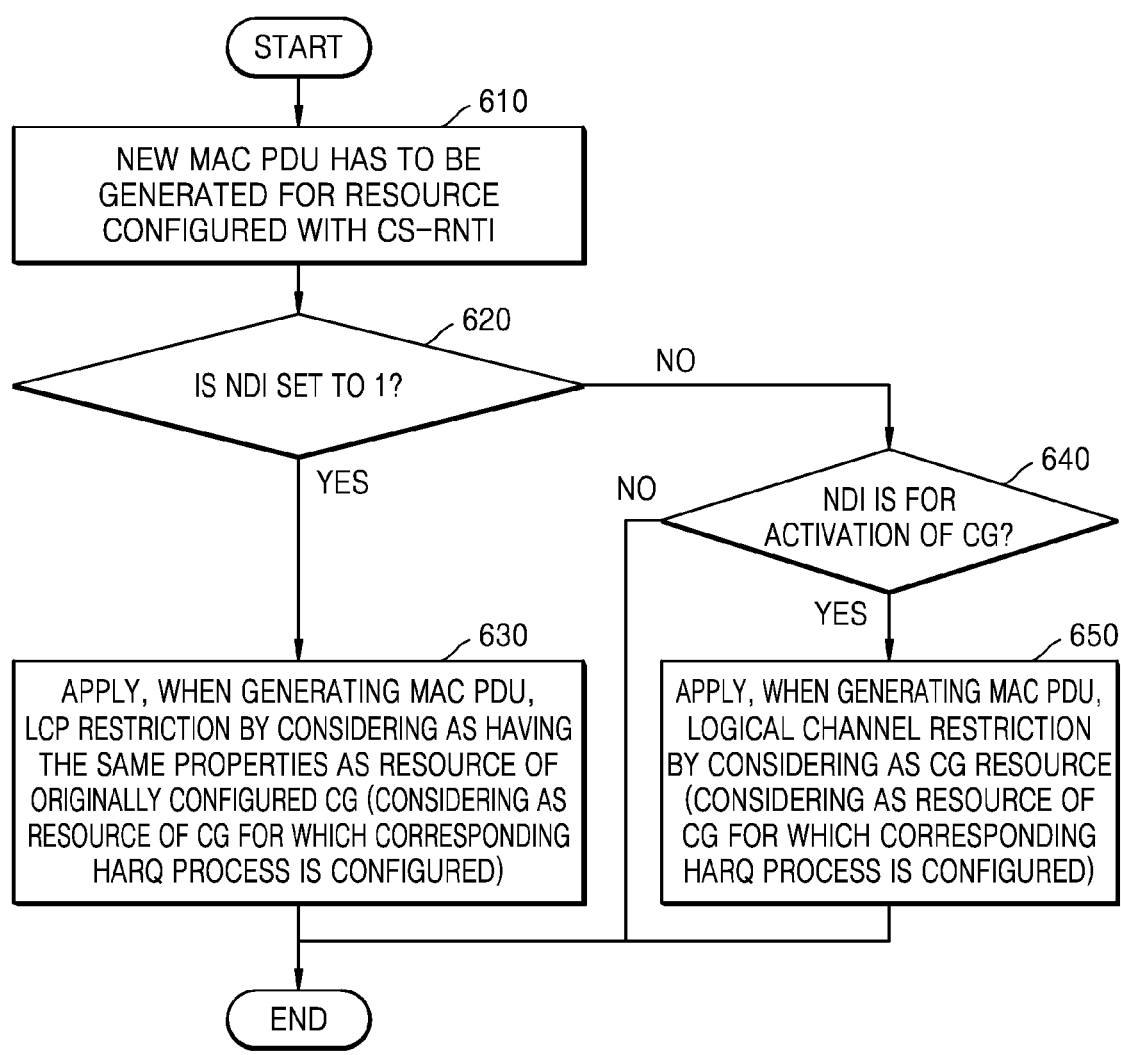
FIG. 6 is a flowchart of a method of applying logical channel restriction to a resource configured with a CS-RNTI, according to another embodiment.

In some embodiments, the same priority rule as that for a CG may be applied to an operation of determining a priority when two resources configured with the CS-RNTI as CG resources overlap with each other FIG. 6 is a flowchart of a method of applying logical channel restriction to a resource configured with a CS-RNTI, according to another embodiment. A situation may occur in which a terminal needs to generate a MAC PDU for a resource configured with a CS-RNTI (operation 610). The situation in which the terminal has to generate a MAC PDU for the resource configured with the CS-RNTI may be at least one of a situation in which a CG is activated so that the terminal has to use a CG resource or a situation in which retransmission using a CG occurs. In this regard, which of the above-described situations occurs may be identified based on a value of an NDI (operation 620). When the value of the NDI is set to 1, this may indicate retransmission on the CG. When the terminal is allocated a retransmission resource, in case there is no MAC PDU in an HARQ buffer, a new MAC PDU needs to be generated. When generating this MAC PDU, logical channel restriction may be applied by considering the resource allocated with the CS-RNTI to have the same properties as a resource of an originally configured CG (operation 630). For example, when a retransmission resource allocated with a CS-RNTI is a retransmission resource for a CG configured with a CG index of 1 and a resource of the CG has a subcarrier spacing of 15 KHz, by considering the retransmission resource allocated with the CS-RNTI as a resource of the CG having the CG index of 1 and having the subcarrier spacing of 15 KHz, a logical channel prioritization operation may be performed so that logical channels, each including a CG with a CG index of 1 in an allowed CG list and 15 KHz in an allowed subcarrier spacing, are allowed to use the CG. However, this is merely an embodiment, and according to another embodiment, when generating a MAC PDU, the resource allocated with the CS-RNTI may be considered to have the same properties as an initial transmission resource of a CG for which a corresponding HARQ process is configured. In some embodiments, the same priority rule as that for a CG may be applied to an operation of determining a priority when two resources configured with the CS-RNTI as CG resources overlap with each other. When the value of the NDI is not 1, this means that the NDI has a value of 0, and the NDI having a value of 0 may indicate activation or deactivation of a CG. When the NDI indicates the activation of the CG (operation 640), when generating the MAC PDU, logical channel restriction may be applied by considering a radio resource indicated by an activated resource as a CG resource. However, this is merely an example, and in another embodiment, when the MAC PDU is generated, a radio resource corresponding to the activated resource may be considered as a resource of a CG in which a corresponding HARQ process is configured (operation 650).

In the embodiment of FIG. 6, an allowed CG list may be applied for a resource on which the CG is retransmitted. The terminal may be allocated a UL radio resource having an NDI value of 1 for the UL resource allocated with the CS-RNTI. In this case, this may mean that logical channels including a CG ID corresponding to the allocated UL radio resource in the allowed CG list use the corresponding UL radio resource. Using the UL radio resource may mean that the logical channels participate in a logical channel prioritization process.

In addition, in the embodiment of FIG. 6, the allowed CG list may be applied for an activated resource of a CG. The terminal may be allocated a UL radio resource having an NDI value of 0 for the UL resource allocated with the CS-RNTI. In this case, this may mean that logical channels including a CG ID corresponding to the allocated UL radio resource in the allowed CG list use the corresponding UL radio resource. Using the UL radio resource may mean that the logical channels participate in the logical channel prioritization process.

Therefore, the allowed CG list that can be configured via each logical channel configuration may be configured to include an ID of a CG associated with a UL CG or the UL radio resource allocated with the CS-RNTI.

In some embodiments, the same priority rule as that for a CG may be applied to an operation of determining a priority when two resources configured with the CS-RNTI as CG resources overlap with each other.

Figure 7:
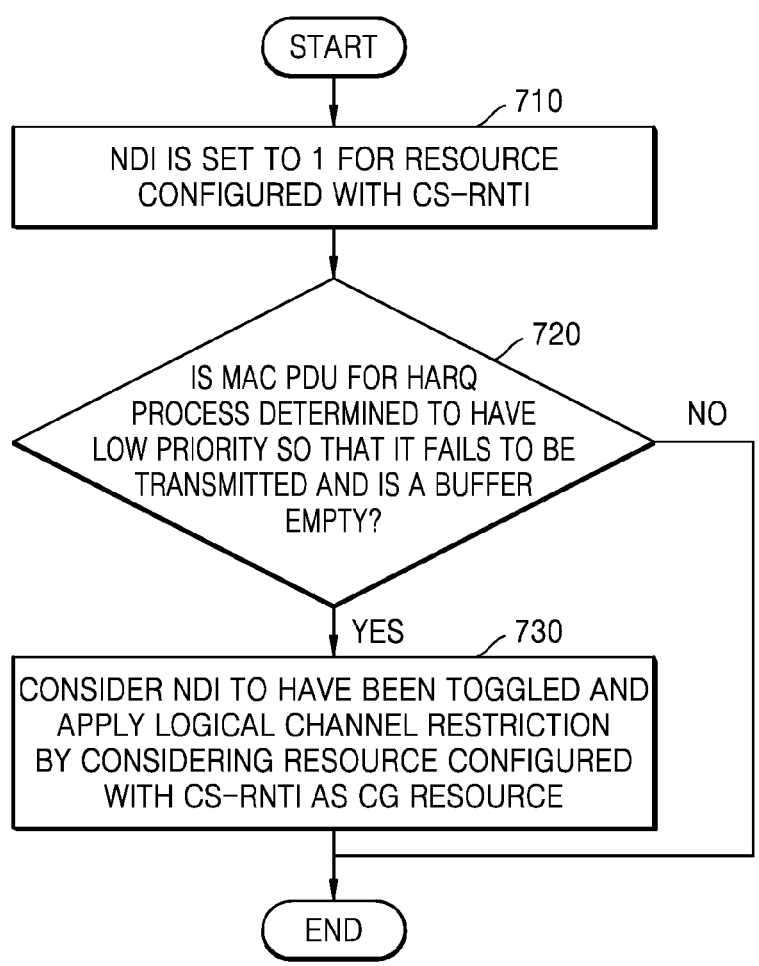
FIG. 7 is a flowchart of an operation of a terminal when a retransmission resource configured with a CS-RNTI is allocated, according to an embodiment.

FIG. 7 is a flowchart of an operation of a terminal when a retransmission resource configured with a CS-RNTI is allocated, according to an embodiment.

When the terminal is allocated a resource with a CS-RNTI and a value of an NDI is set to 1 at this time (operation 710), the terminal may determine the resource as a retransmission resource of a CG. In this case, a CG initial transmission for a corresponding HARQ process may be determined to have a low priority. When a MAC PDU to be initially transmitted with the CG is determined to have a low priority and thus fails to be transmitted, and an HARQ buffer of the HARQ process is empty (operation 720), the terminal may perform new transmission on a radio resource in which the value of the ND1 is set to 1 with the CS-RNTI. The terminal may identify whether the NDI has been toggled to determine that the transmission is a new transmission, and when the NDI is considered to have been toggled (e.g., the NDI is considered to have been toggled when NDI=1), the terminal may apply logical channel restriction by considering the resource configured with the CS-RNTI as a CG resource (operation 730). In some embodiments, the same priority rule as that for a CG may be applied to an operation of determining a priority when two resources configured with the CS-RNTI as CG resources overlap with each other.

Figure 8:
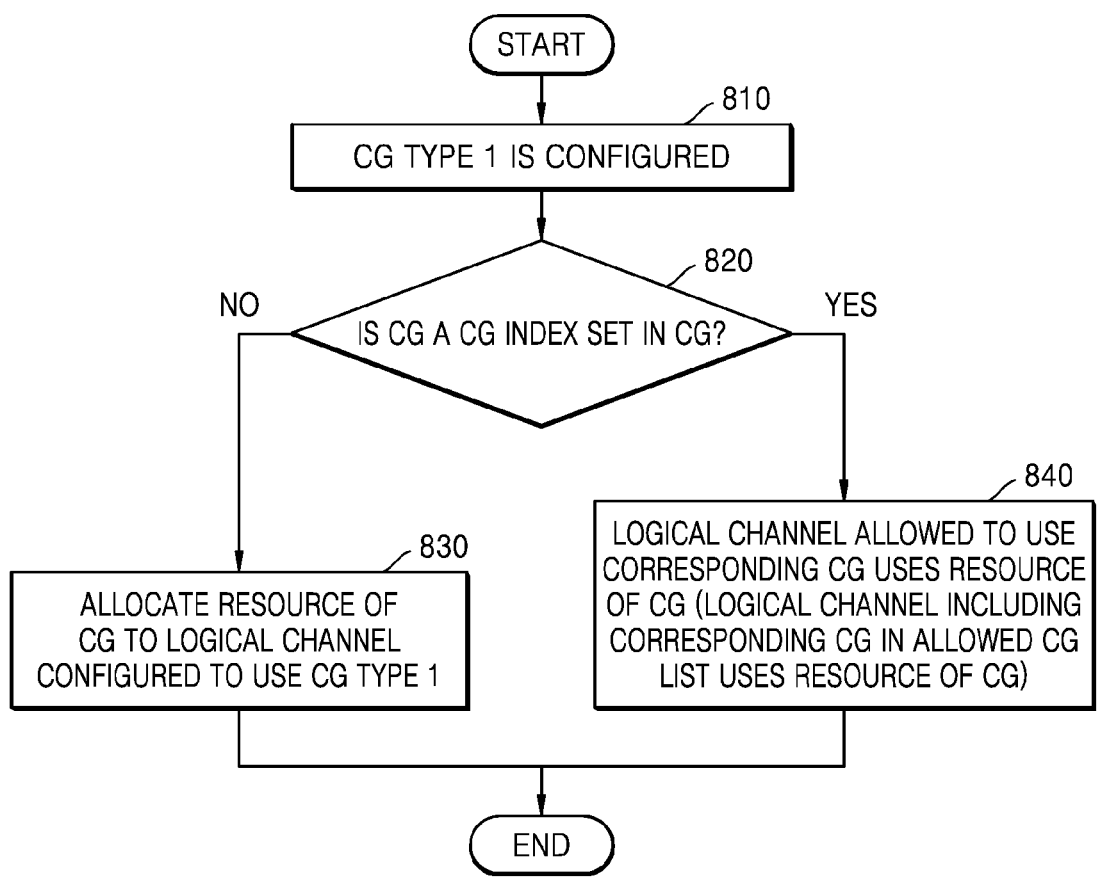
FIG. 8 is a diagram for explaining a criterion as to when to apply a list of configured grants, according to an embodiment.

FIG. 8 is a diagram for explaining a criterion as to when to apply a list of CGs, according to an embodiment.

Logical channel restriction on whether the terminal is to use a CG may be configured by ConfiguredGrantType1Allowed indicating whether to use a CG type 1 or by an allowed CG list. However, the above two criteria need not be applied at the same time.

Therefore, when a CG type 1 is configured (operation 810), the terminal needs to determine which logical channel restriction is to be configured. According to the embodiment of FIG. 8, the terminal may determine which logical channel restriction is to be configured according to whether a CG is configured with a CG Index (operation 820). When the CG is not configured with a CG index, only one CG type 1 may be configured. In this case, because a CG list is not required, a resource of the corresponding CG may be allocated to a logical channel configured so that the CG type 1 can be used (ConfiguredGrantType1Allowed=true) (operation 830). According to another example, when the CG is configured with a CG index, multiple CGs may be configured as CG type 1, and a CG Index may be an identifier of each CG. In this case, a logical channel allowed to use the corresponding CG may be able to use a resource of the CG. In other words, a logical channel including the corresponding CG in an allowed CG list is allowed to use the CG.

Figure 9:
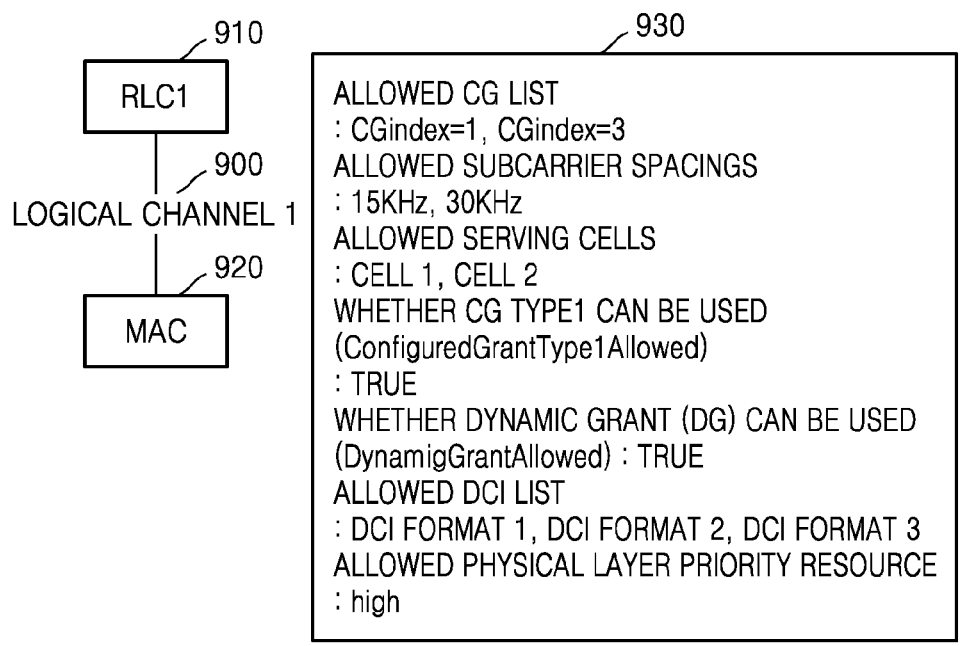
FIG. 9 is a diagram for explaining a method of applying logical channel restriction according to an embodiment.

FIG. 9 is a diagram for explaining a method of applying logical channel restriction according to an embodiment.

In a 5G communication system according to an embodiment, a logical channel 1 900 refers to a path connecting an RLC entity 910 and an MAC entity 920, and one logical channel may correspond to one RLC entity. In UL data transmission, each logical channel may have restrictions on available radio resources (930). Restrictions on available radio resources for each logical channel are for allowing data of a logical channel to be transmitted only on specific resources by taking into account QoS requirements, etc. of data processed in the logical channel. In cell restrictions associated with a logical channel, one or more of an allowed CG list, allowed subcarrier spacings, allowed serving cells, whether a CG type 1 can be used (ConfiguredGrantType1Allowed), whether a DG can be used (DynamicGrantAllowed), an allowed DCI format list, and an allowed physical layer priority resource may be configured. In the embodiment of FIG. 9, it is assumed that logical channel 1 900 is allowed to use CGs with CG indexes of 1 and 3, subcarrier spacings of an available resource being 15 KHz and 30 KHz, and serving cells 1 and 2, whether the CG type 1 can be used is set to true, whether a DG can be used is set to true, an allowed DCI format list includes DCI formats 1, 2, and 3, and an allowed physical layer priority is set to be high. In this case, the terminal may use a corresponding resource when all of the configured cell restrictions are satisfied. Because FIG. 9 illustrates an example in which a logical channel restriction is applied, different logical channel configurations may be applied for each logical channel, and logical channel configurations may not be applied for some logical channels. When a new MAC PDU is generated, the logical channel restriction may be applied to allow only a logical channel that is allowed to use a resource to participate in logical channel prioritization so that data is included in the MAC PDU.

Among the configured restrictions, whether a DG can be used may be set by a 1-bit indicator, and when the corresponding field is set, it is understood that a resource configured as a DG can be used. According to an embodiment, the above may be applied according to whether a DG resource cannot be used. The allowed DCI format list that limits logical channels according to a DCI format means that logical channels is able to use only resources configured via a specific DCI format. The physical layer priority resource may be determined based on a value of a DCI field or a physical layer priority when the physical layer priority is classified according to a specific DCI field group. For example, resources configured via DCI formats 1 and 2 may be determined to have a high physical layer priority, and resources configured via other DCI formats may be determined to have a low physical layer priority.

Figure 10:
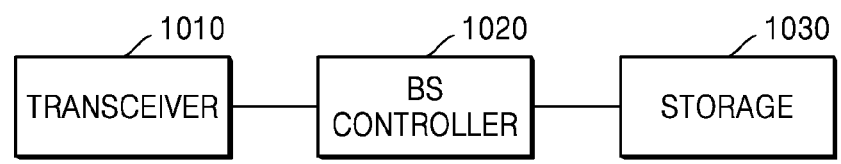
FIG. 10 is a diagram illustrating a structure of a base station according to an embodiment of the present disclosure.

FIG. 10 is a diagram illustrating a structure of a BS according to an embodiment of the present disclosure.

Referring to FIG. 10, the BS may include a transceiver 1010, a controller 1020, and a storage 1030. In the present disclosure, the controller 1020 may be defined as a circuit or an application-specific integrated circuit, or at least one processor.

The transceiver 1010 may transmit or receive signals to or from other network entities. For example, the transceiver 1010 may transmit, to a terminal, system information as well as a synchronization signal or a reference signal.

The controller 1020 may control all operations of the BS according to an embodiment proposed in the present disclosure. For example, the controller 1020 may control a flow of signals between blocks so that the BS performs operations according to the above-described flowchart. The storage 1030 may store at least one of information transmitted and received via the transceiver 1010 and information generated via the controller 1020.

Figure 11:
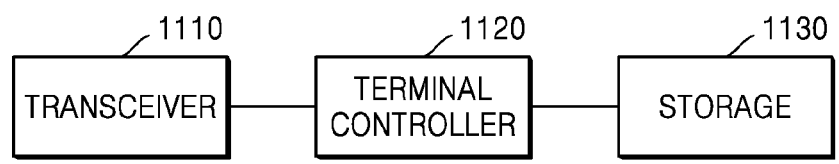
FIG. 11 is a diagram illustrating a structure of a terminal according to an embodiment of the present disclosure.

FIG. 11 is a diagram illustrating a structure of a terminal according to an embodiment of the present disclosure.

Referring to FIG. 11, the terminal may include a transceiver 1110, a controller 1120, and a storage 1130. In the present disclosure, the controller 1120 may be defined as a circuit or an application-specific integrated circuit, or at least one processor.

The transceiver 1110 may transmit or receive signals to or from other network entities. For example, the transceiver 1110 may receive, from a BS, system information as well as a synchronization signal or a reference signal.

The controller 1120 may control all operations of the terminal according to an embodiment proposed in the present disclosure. For example, the controller 1120 may control a flow of signals between blocks so that the terminal performs operations according to the above-described flowchart.

The storage 1130 may store at least one of information transmitted and received via the transceiver 1110 and information generated via the controller 1120.

Figure 12:
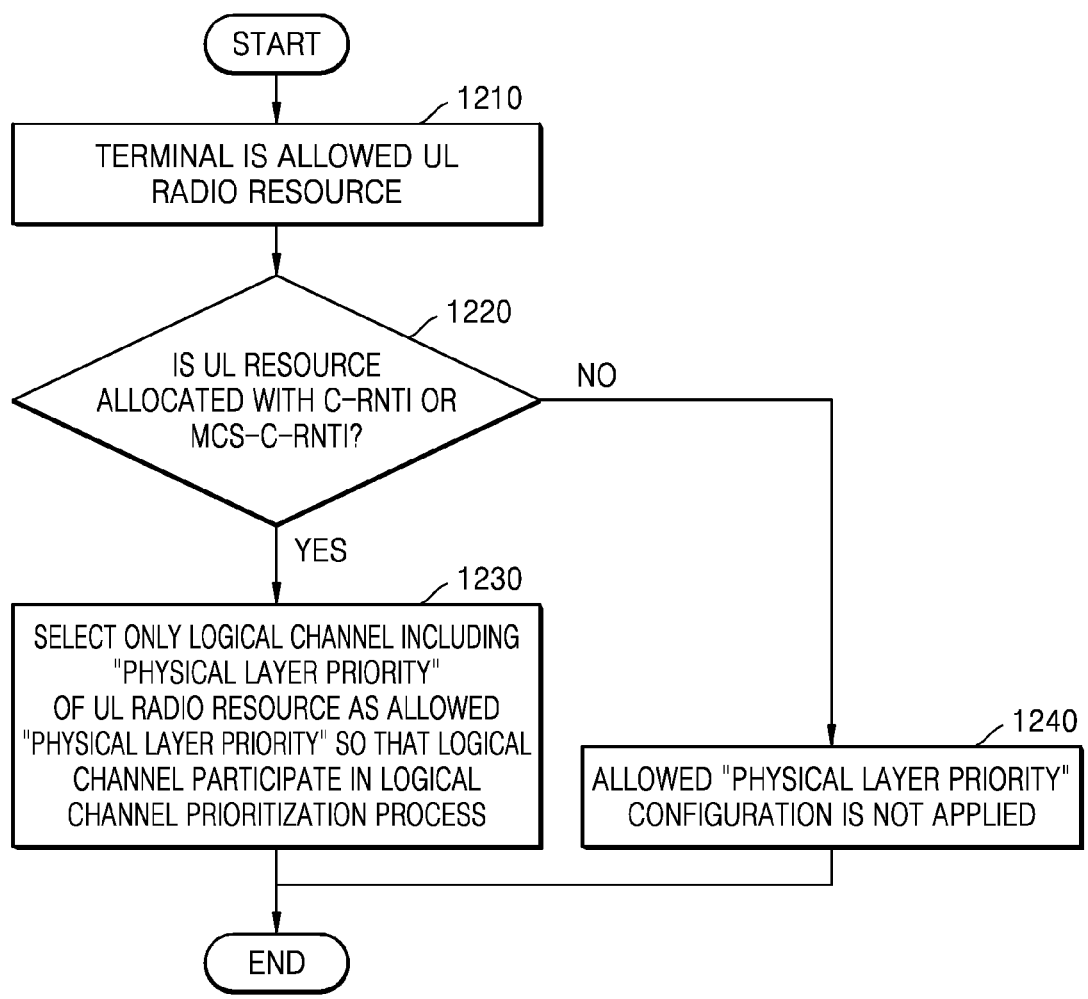
FIG. 12 is a flowchart of a method of applying an allowed physical layer priority configuration, according to an embodiment of the present disclosure.

FIG. 12 is a flowchart of a method of applying an allowed physical layer priority configuration, according to an embodiment of the present disclosure.

When UL radio resources overlap on the time axis or on the time and frequency axes, a BS may set a physical layer priority for each UL radio resource in order to determine which UL resource is to be selected for transmission. This physical layer priority may be set in a DCI field transmitted on a PDCCH.

In operation 1210, a terminal may be allocated an UL radio resource where a specific physical layer priority is set. In this case, an MAC entity of the terminal may determine a logical channel from which data is to be included in the corresponding UL radio resource and transmitted. For this purpose, the terminal may set a physical layer priority that can be used for each logical channel configuration. Based on this, during a logical channel prioritization process, each logical channel may transmit data by including data only in a UL resource with an allowed physical layer priority.

Although a physical layer priority may be configured for both a CG and a DG, because which logical channel data is to be included may be indicated by an allowed CG list for the CG and the DG configured with the CS-RNTI, physical layer priority configurations may be applied only for C-RNTI and modulation and coding scheme (MCS)-C-RNTI resources without such an indication thereof.

In operation 1220, when the terminal is allocated an UL radio resource, the terminal may identify whether the resource is allocated with C-RNTI or MCS-C-RNTI. In operation 1230, when the allocated UL radio resource is a resource allocated with a C-RNTI or MC S-C-RNTI, the UL radio resource may be a resource to which an allowed physical layer priority is to be applied.

In operation 1230, based on the allowed physical layer priority, only a logical channel including a physical layer priority of the corresponding UL radio resource is selected, and the selected logical channel may participate in a logical channel prioritization process.

In operation 1240, when the terminal is allocated an UL radio resource that is not a resource allocated with a C-RNTI or MCS-C-RNTI, the UL radio resource is a CG resource or an activated resource (a first CG type 2 resource) or a retransmission resource of a CG allocated with a CS-RNTI, and thus, an allowed physical layer priority does not need to be applied. Therefore, an allowed physical layer priority configuration may not be applied.

Thus, an allowed physical layer priority which is configurable via each logical channel configuration may be configured to include a physical layer priority index associated with a UR radio resource configured with a C-RNTI or MCS-C-RNTI among UL radio resources.

The methods according to the embodiments of the present disclosure described in the appended claims or specification thereof may be implemented in hardware, software, or a combination of hardware and software.

When the methods are implemented in software, a computer-readable storage medium having at least one program (software module) stored therein may be provided. The at least one program stored in the computer-readable storage medium is configured for execution by at least one processor within an electronic device. The at least one program includes instructions that cause the electronic device to execute the methods according to the embodiments of the present disclosure described in the claims or specification thereof.

The program (software module or software) may be stored in random access memory (RAM), non-volatile memory including a flash memory, read-only memory (ROM), electrically erasable programmable ROM (EE-PROM), magnetic disc storage devices, compact disc (CD)-ROM, digital versatile discs (DVDs) or other types of optical storage devices, and magnetic cassettes. Alternatively, the program may be stored in a memory that is configured as a combination of some or all of the stated devices. A plurality of such devices may be included in the memory.

Furthermore, the program may be stored in an attachable storage device that may be accessed through communication networks, such as the Internet, Intranet, a local area network (LAN), a wide LAN (WLAN), and a storage area network (SAN), or a communication network configured in a combination thereof. The storage device may connect to a device for performing the methods according to the embodiments of the present disclosure via an external port. Furthermore, a separate storage device on a communication network may also connect to a device for performing the methods according to the embodiments of the present disclosure.

In the specific embodiments of the present disclosure, a component included in the present disclosure is expressed in a singular or plural form depending on the presented specific embodiments. However, singular or plural expressions are selected to be suitable for situations presented for convenience of description, and the present disclosure is not limited to elements in a singular or plural form, i.e., an element expressed in a plural form may be configured as a single element, or an element expressed in a singular form may be configured as a plurality of elements.

Moreover, although specific embodiments have been described in the detailed description of the present disclosure, various modifications may be made therein without departing from the scope of the present disclosure. Thus, the scope of the present disclosure should not be limited to the described embodiments but be defined by the following claims as well as their equivalents.

The invention claimed is:

1. An operation method of a terminal in a wireless communication system, the operation method comprising:
receiving configuration information for logical channels, wherein the configuration information includes an allowed configured grant list;
identifying a received uplink grant is an uplink grant allocated with a configured scheduling-radio network temporary identifier (CS-RNTI); and
in case that the received uplink grant is the uplink grant addressed to the CS-RNTI, identifying a value of a new data indicator (NDI) associated with the uplink grant addressed to the CS-RNTI is;
wherein the uplink grant is considered as a configured grant in case that the value of the NDI is 0, and
wherein the allowed configured grant list is applied to the uplink grant considered as the configured grant.

2. The operation method of claim 1,
wherein in case that the value of the NDI is 1, the uplink grant is considered as a dynamic grant,
wherein an allowed physical layer priority configuration is applied to the uplink grant considered as the dynamic grant, and
wherein the allowed physical layer priority configuration is included in the configuration information for logical channels.

3. The operation method of claim 2, further comprising selecting a logical channel to which the allowed physical layer priority configuration is applied,
wherein the selected logical channel participates in a logical channel prioritization process.

4. The operation method of claim 1, further comprising applying a priority rule to the uplink grant.

5. The operation method of claim 4, wherein the priority rule is applied to the uplink grant by considering the uplink grant as a configured grant.

6. The operation method of claim 1, wherein the configuration information includes at least one of allowed subcarrier spacings, or allowed serving cells.

7. A terminal in a wireless communication system, the terminal comprising:
a transceiver; and
at least one processor connected with the transceiver,
wherein the at least one processor is configured to:
receive configuration information for logical channels, wherein the configuration information includes an allowed configured grant list;
identify a received uplink grant is an uplink grant allocated with a configured scheduling-radio network temporary identifier (CS-RNTI); and
in case that the received uplink grant is the uplink grant addressed to the CS-RNTI, identify a value of a new data indicator (NDI) associated with the uplink grant addressed to the CS-RNTI is 0,
wherein the uplink grant is considered as a configured grant in case that the value of the NDI is 0, and
wherein the allowed configured grant list is applied to the uplink grant considered as the configured grant.

8. The terminal of claim 7,
wherein in case that the value of the NDI is 1, the uplink grant is considered as a dynamic grant,
wherein an allowed physical layer priority configuration is applied to the uplink grant considered as the dynamic grant, and
wherein the allowed physical layer priority configuration is included in the configuration information for logical channels.

9. The terminal of claim 8, wherein the at least one processor is further configured to select a logical channel to which the allowed physical layer priority configuration is applied, and
wherein the selected logical channel participates in a logical channel prioritization process.

10. The terminal of claim 7,
wherein the at least one processor is further configured to apply a priority rule to the uplink grant, and
wherein the priority rule is applied to the uplink grant by considering the uplink grant as a configured grant.

11. The terminal of claim 7, wherein the configuration information includes at least one of allowed subcarrier spacings, or allowed serving cells.

12. An operation method of a base station in a wireless communication system, the operation method comprising:
transmitting configuration information for logical channels, wherein the configuration information includes an allowed configured grant list; and
receiving, based on the configuration information, uplink data on an uplink grant allocated with a configured scheduling-radio network temporary identifier (CS-RNTI),
wherein the uplink grant is considered as a configured grant in case that the uplink grant addressed to the CS-RNTI with a value of a new data indicator (NDI) is 0, and
wherein the allowed configured grant list is applied to the uplink grant considered as the configured grant.

13. A base station in a wireless communication system, the base station comprising:
a transceiver; and
at least one processor connected with the transceiver,
wherein the at least one processor is configured to:
transmit configuration information for logical channels, wherein the configuration information includes an allowed configured grant list; and
receive, based on the configuration information, uplink data on an uplink grant allocated with a configured scheduling-radio network temporary identifier (CS-RNTI),
wherein the uplink grant is considered as a configured grant in case that the uplink grant addressed to the CS-RNTI with a value of a new data indicator (NDI) is 0, and
wherein the allowed configured grant list is applied to the uplink grant considered as the configured grant.

* * * * *